(12) United States Patent
Schlesinger

(10) Patent No.: US 9,587,849 B2
(45) Date of Patent: Mar. 7, 2017

(54) HEATING, VENTILATION, AND AIR CONDITIONING SYSTEM

(71) Applicant: Stephen Schlesinger, University Heights, OH (US)

(72) Inventor: Stephen Schlesinger, University Heights, OH (US)

( * ) Notice: Subject to any disclaimer, the term of this patent is extended or adjusted under 35 U.S.C. 154(b) by 728 days.

(21) Appl. No.: 13/782,296

(22) Filed: Mar. 1, 2013

(65) Prior Publication Data

US 2014/0245762 A1 Sep. 4, 2014

(51) Int. Cl.

| | |
|---|---|
| F25B 27/00 | (2006.01) |
| F24F 11/00 | (2006.01) |
| F24F 3/044 | (2006.01) |
| F25B 49/02 | (2006.01) |
| F25B 13/00 | (2006.01) |

(52) U.S. Cl.
CPC ............ *F24F 11/008* (2013.01); *F24F 3/044* (2013.01); *F25B 49/02* (2013.01); *F24F 2203/02* (2013.01); *F25B 13/00* (2013.01); *F25B 27/00* (2013.01); *F25B 2313/0293* (2013.01); *F25B 2600/0253* (2013.01); *Y02B 30/741* (2013.01); *Y02B 30/767* (2013.01)

(58) Field of Classification Search
CPC ....................................................... F24F 3/044
See application file for complete search history.

(56) References Cited

U.S. PATENT DOCUMENTS

| | | | | |
|---|---|---|---|---|
| 3,678,284 A | * | 7/1972 | Peters ....................... | F24F 5/00 290/1 R |
| 4,086,781 A | * | 5/1978 | Brody ...................... | F24F 11/04 165/250 |
| 4,128,800 A | * | 12/1978 | Scott ....................... | H02J 7/245 290/54 |
| 4,716,957 A | * | 1/1988 | Thompson .............. | F24F 3/001 165/11.1 |
| 5,025,638 A | * | 6/1991 | Yamagishi .............. | F24F 3/044 236/49.3 |
| 5,817,276 A | | 10/1998 | Fencl et al. | |
| 6,149,717 A | * | 11/2000 | Satyapal ................. | F24F 3/166 96/16 |
| 6,500,267 B1 | | 12/2002 | Fencl et al. | |
| 6,627,000 B2 | | 9/2003 | Fencl et al. | |
| 6,673,137 B1 | | 1/2004 | Wen | |
| 6,746,134 B1 | | 6/2004 | Guzorek | |

(Continued)

*Primary Examiner* — Orlando Aviles Bosques
(74) *Attorney, Agent, or Firm* — Howard M. Cohn; Daniel M. Cohn

(57) ABSTRACT

A high-efficiency HVAC system and method of operation, for use in a house or building, having a plurality of components, including flexible, plastic duct tubing forming supply pipes that connect an air handler and a plurality of zones to deliver supply air to the zones and return pipes that connect the air handler and the zones to re-circulate return air; the air handler having a fan assembly powered by a variable blower motor to blow supply air to the zones; a heat pump having a variable compressor powered by a variable compressor motor to direct a working fluid to and from the air handler and a variable fan motor that rotates a fan blade within the heat pump; and a circuit control system for adjusting the variable compressor motor and the variable fan motor in the heat pump and the variable blower motor in the air handler.

7 Claims, 7 Drawing Sheets

(56) References Cited

U.S. PATENT DOCUMENTS

| | | | |
|---|---|---|---|
| 7,490,480 B2* | 2/2009 | Davis | F25D 17/065 62/180 |
| 7,704,463 B2 | 4/2010 | Willette | |
| 2003/0101872 A1 | 6/2003 | Peel et al. | |
| 2005/0095978 A1* | 5/2005 | Blunn | F24F 11/0001 454/229 |
| 2006/0207267 A1 | 9/2006 | Erdman | |
| 2008/0086981 A1 | 4/2008 | Kilkis et al. | |
| 2008/0156007 A1* | 7/2008 | Cur | F25B 5/02 62/175 |
| 2009/0301118 A1* | 12/2009 | Chen | F24F 5/0007 62/235.1 |
| 2010/0237623 A1* | 9/2010 | Brown | E02B 9/08 290/53 |
| 2010/0307100 A1* | 12/2010 | Bingham | F26B 9/02 52/741.3 |
| 2011/0011112 A1 | 1/2011 | Goel et al. | |
| 2012/0228279 A1 | 9/2012 | Haas et al. | |

\* cited by examiner

HEATING, VENTILATION, AND AIR CONDITIONING SYSTEM

TECHNICAL FIELD OF THE INVENTION

The present invention relates generally to a high-efficiency HVAC system for use in a house or building. More specifically, the present invention relates to a HVAC system including flexible, plastic duct tubing forming supply pipes and return pipes that connect an air handler and a plurality of zones, the air handler having a fan assembly powered by a variable blower motor, a heat pump having a variable compressor powered by a variable compressor motor and a variable fan motor, and a circuit control system for adjusting the variable compressor motor, the variable fan motor and the variable blower motor.

BACKGROUND OF THE INVENTION

Heating, ventilation and air-conditioning (HVAC) systems have to satisfy three primary comfort functions, namely heating and cooling, humidity control, and ventilation. These functions are usually delegated to either a central forced convection air-conditioning system, or unitary air-conditioners, or hydraulic heating/cooling systems (like convective fan-coils or radiant panels). HVAC systems are typically comprised of fans and ductwork for moving air where needed. An HVAC system will include a cooling and heating section for cooling and heating the air. In most HVAC systems, air is drawn in, filtered, cooled and dehumidified or heated and humidified, and then delivered to a room. The greatest portion of this air is drawn from the conditioned space for recirculation through the HVAC system.

The HVAC industry is economically sensitive to costs. Because of the competitive nature of both the construction and HVAC industries, HVAC systems must be inexpensive to install. Of a more global interest though, is the cost to operate and maintain HVAC systems. Often, a building owner will replace an aging HVAC system as the reduction in operating and maintenance costs can offset the retrofit cost, sometimes in a matter of months. Broad social and energy policies also favor more efficient HVAC systems. In these days of electricity deregulation and conservation, it has become even more important to conserve energy consumption.

SUMMARY OF THE INVENTION

According to an embodiment of the present invention, there is disclosed high-efficiency HVAC system for use in a house or building, having a plurality of components. The components include flexible, plastic duct tubing forming supply pipes that connect an air handler and a plurality of zones to deliver supply air to the zones in the house or building and return pipes that connect the air handler and the plurality of zones to re-circulate return air from the zones to the air handler; the air handler having a fan assembly powered by a variable blower motor to blow supply air through the supply pipes to the plurality of zones to individually control air humidity, air purity and air temperature within the zones in the building or house; a heat pump having a variable compressor powered by a variable compressor motor to direct a working fluid to and from the air handler and a variable fan motor that rotates a fan blade within the heat pump; and a circuit control system for adjusting the variable compressor motor and the variable fan motor in the heat pump and the variable blower motor in the air handler in response to the capacity required by the HVAC system.

According to another embodiment of the present invention, a method of operating a high-efficiency HVAC system for use in house or building, having a plurality of components is disclosed. The method includes delivering supply air to a plurality of zones in the house or building from an air handler through flexible, plastic duct tubing; re-circulating return air from the zones to the air handler through flexible, plastic duct tubing; blowing supply air with a fan assembly powered by a variable blower motor disposed within the air handler to the plurality of zones; directing a working fluid from a heat pump having a variable compressor powered by a variable compressor motor to and from the air handler; rotating a fan blade within the heat pump with a variable fan; and adjusting the variable compressor motor and the variable fan motor in the heat pump and the variable blower motor in the air handler in response to the capacity required by the HVAC system.

According to another embodiment of the present invention, a high-efficiency HVAC system kit for use in house or building, having a plurality of components is disclosed. The components include flexible, plastic duct tubing forming supply pipes that connect an air handler and a plurality of zones to deliver supply air to the zones in the house or building and return pipes that connect the air handler and the plurality of zones to re-circulate return air from the zones to the air handler; the air handler having a fan assembly powered by a variable blower motor to blow supply air through the supply pipes to the plurality of zones to individually control air humidity, air purity and air temperature within the zones in the building or house; a heat pump having a variable compressor powered by a variable compressor motor to direct a working fluid to and from the air handler and a variable fan motor that rotates a fan blade within the heat pump; and a circuit control system for adjusting the variable compressor motor and the variable fan motor in the heat pump and the variable blower motor in the air handler in response to the capacity required by the HVAC system.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

Figure 1:
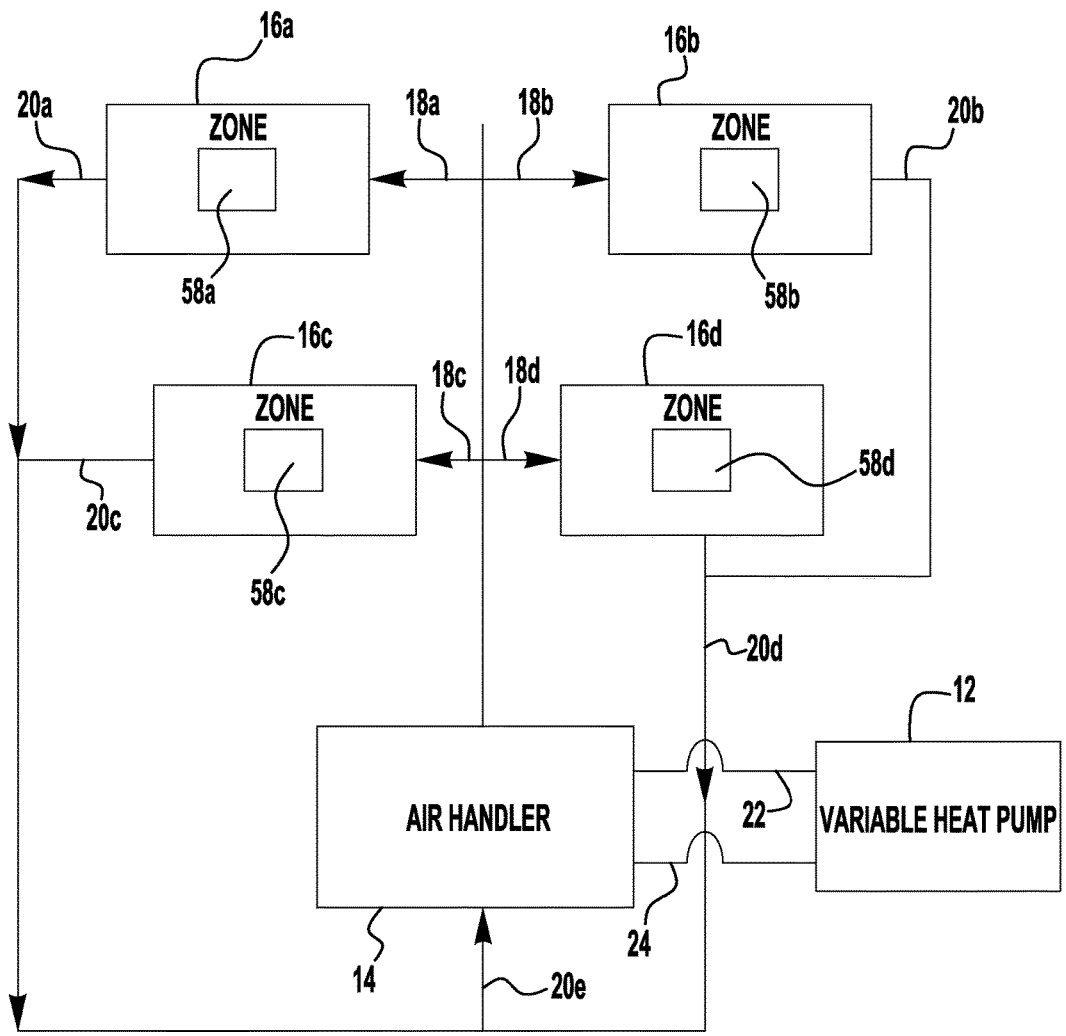
FIG. 1 is a schematic view of a heating, ventilation and air-conditioning (HVAC) system, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Heating, ventilation and air conditioning (HVAC) systems help to control the climate in a house or building, and keep occupants comfortable by regulating the temperature and air flow. HVAC systems are also important to occupants' health, because a well regulated and maintained system will keep a house free from mold and other harmful organisms. HVAC systems typically include cooling and heating systems for cooling and heating the air, respectively, and metal or fiberglass air distribution ductwork for moving air where needed. In most HVAC systems, air is drawn in, filtered, heated and humidified or cooled and dehumidified or in a heating or cooling system, and then delivered to the rooms in the house or building. The greatest portion of the air being drawn into the heating or cooling system is re-circulated from the rooms being heated or cooled by the HVAC system.

FIG. 1 illustrates a heating, ventilation and air-conditioning (HVAC) system (hereafter "HVAC System") 10, designed to allow houses and businesses to control humidity, temperature, air purification and air flow within different zones houses and businesses with the use of a high-efficiency, factory assembled device. A common problem many house owners and business owners face when installing traditional HVAC systems is the considerable amount of necessary installation time as well as significant material costs due to the need to provide the metal or fiberglass duct work throughout the buildings.

The HVAC system 10 is a high-efficiency system, which utilizes a flexible, plastic duct tubing along with a motorized, variable blower to push high volumes of conditioned air into the ductwork and thereby reduce air duct cleaning.

The main components of the HVAC system 10 are brought to the installation location as pre-assembled factory-tested units (as described below). The HVAC system 10 allows a user to control air humidity, purity and temperature in a plurality of different zones within a house or business by utilizing the appropriate controls, such as individual programmable thermostats with touch screen controls. It is also within the terms of the embodiment to operate the system for ventilation purposes where the temperature of the air is not changed, but the air can be purified and re-circulated throughout the zones. HVAC system 10 is unique in that the components are pre-assembled and tested in factory-tested and require much less time to install as compared to the typical HVAC system.

As seen in FIG. 1, HVAC system 10 includes a variable heat pump 12, an air handler 14, and a plurality of zones 16, such as zones 16a, 16b, 16c, and 16d (16a-16d) being connected to the air handler 14 by flexible, plastic duct tubing forming supply and return lines 18 and 20, respectively.

In general terms, heat pump 12 directs a working fluid, such as a refrigerant or coolant to and from the air handler 14 through lines 22 and 24, respectively. In turn, the air handler 14 receives re-circulated air through return lines 20 from within the various rooms or zones 16a-16d within the house and then filters, humidifies, dehumidifies, heats and/or cools the supply air being sent back to the zones 16a-16d through lines 18. The various zones 16a-16d each have their own separate controls, such as programmable thermostats in order that each zone be regulated independently. A single human interface, e.g., the programmable thermostat or other control device, is used to send signals to the air handler 14 that cause the system components of the HVAC system 10 to act in a cooperative manner to produce a desired state of operation in response to a particular thermostat setting. For example, zones 16a-16d could each be set to a different temperature or humidity.

It is with the terms of the embodiment that HVAC system 10 also provides a system and method that continuously updates the thermal model of a commercial building. In this embodiment, HVAC system 10 relies upon a continuously adjustable, thermal model of the commercial building and the control system continuously re-learns thermal and comfort models, and subsequently re-adjusts the thermal behavior of the house or building at regular intervals.

Figure 2:
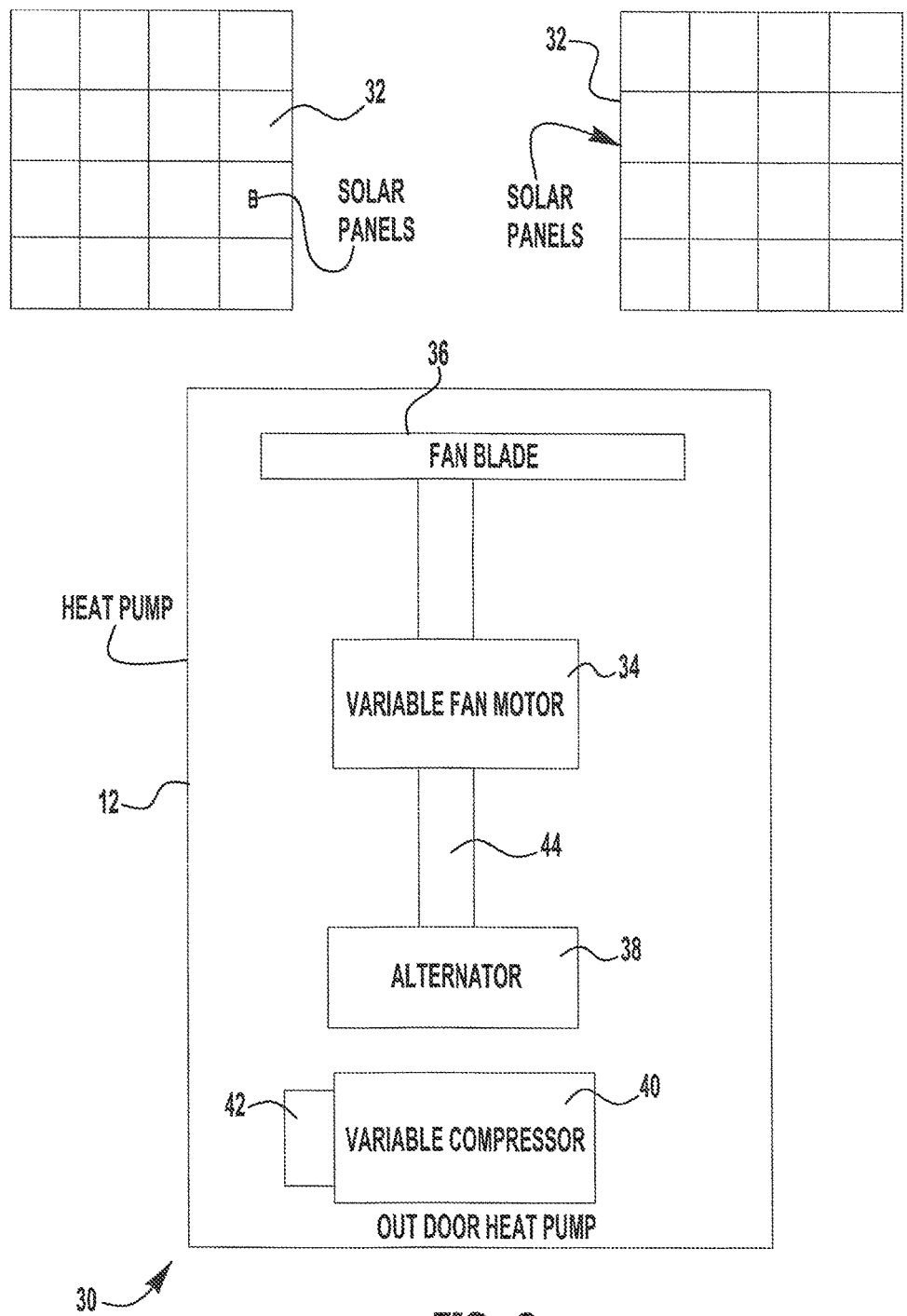
FIG. 2 is a schematic view of an outdoor system unit including a heat pump and a solar generation system, in accordance with the present invention.

FIG. 2 illustrates an outdoor heat pump system unit 30 that includes the variable heat pump 12 and one or more solar panels 32. Generally, the variable heat pump 12 is a vapor-compression refrigeration device that includes a reversing valve and optimized heat exchangers so that the direction of heat flow (thermal energy movement) may be reversed.

The heat pump 12 includes a variable fan motor 34, a fan blade 36, an alternator 38, and a variable compressor 40. The variable fan motor 34 rotates the fan blade 36 and the alternator with a shaft 44. The variable fan motor 34 is powered by electricity from an external power outlet (not shown), generated by the alternator 38 and/or the solar panels 32.

In normal operation, the variable fan motor 34 turns both the alternator 38, which generates electrical power for the heat pump 12, as well as rotating the fan blade 36 to force air over the condenser coils. Alternatively, when the variable fan motor 34 is not running, wind can turn the fan blade 36 and the shaft 44 so as to provide rotate the alternator 38 with wind energy while bypassing the variable fan motor 34. Further, when the HVAC system 10 is not in use, electrical energy created by the fan blade 36 turning the alternator 38 can be sent into the house's power grid, reducing the amount of energy needed from the power company.

It is also within the terms of the embodiment that the one or more solar panels 32 can provide power to the various components of the HVAC system 10 including the variable fan motor 34, the variable compressor 40, and the air handler 14. When the HVAC System 10 is not in use, energy created by the one or more solar panels 30 can be sent into the house's power grid, reducing the amount of energy needed from the power company.

Figure 3:
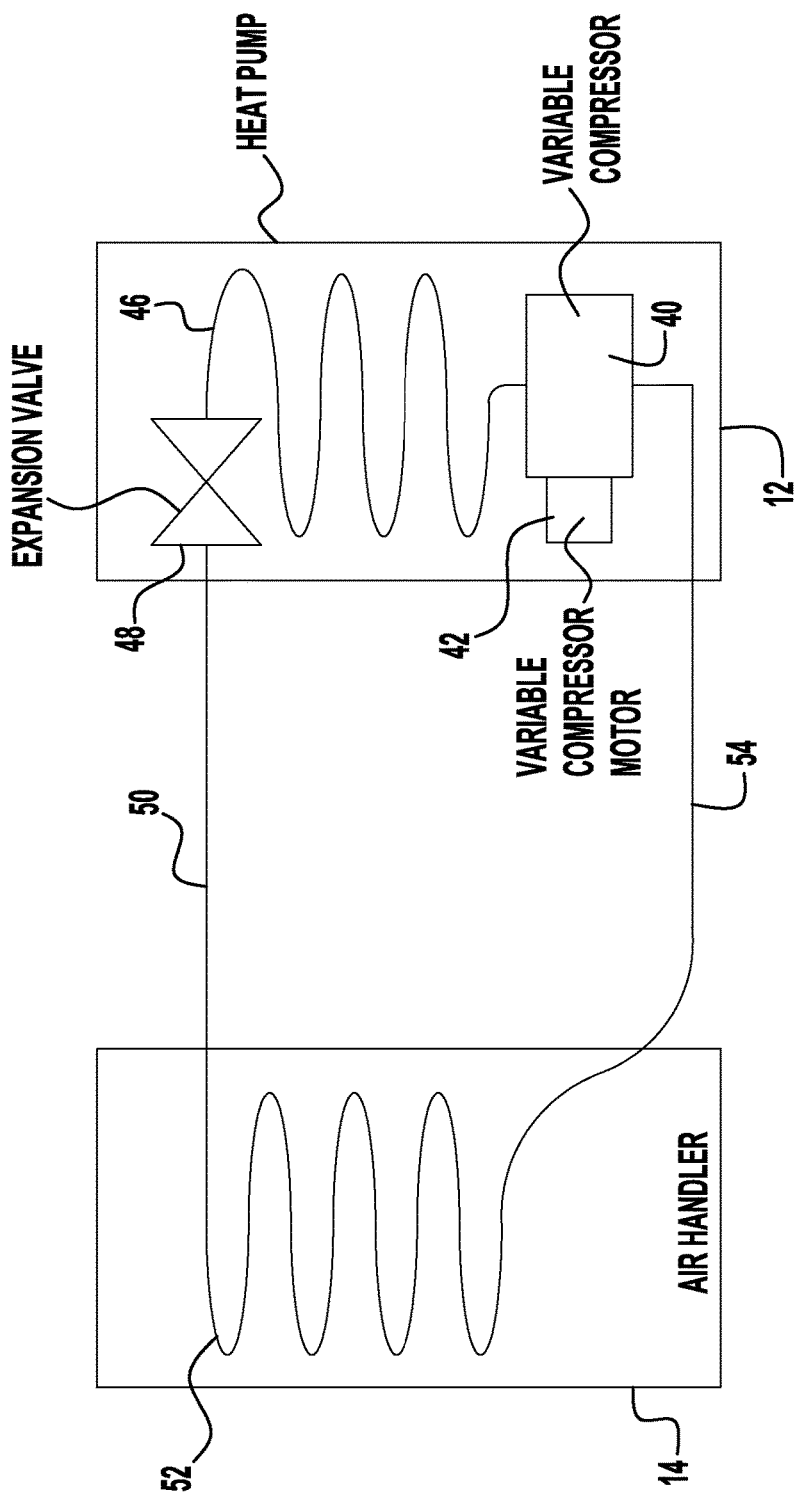
FIG. 3 is a schematic view of a heat pump and an air handler, in accordance with the present invention.

Referring to FIG. 3, a description of the refrigeration cycle is provided. The variable compressor 40, powered by a variable compressor motor 42, located in heat pump 12 pressurizes and circulates the working fluid from an outlet end of the compressor, through a condensing coil 46 and an expansion valve 48 within the heat pump. An example of a variable speed compressor is a Copeland Scroll Variable Speed Compressor by Emerson Climate Technology. Then the working fluid, in a vapor form flows through a tube 50 and through an expansion coil 52 within the air handler 14. The working fluid picks up heat in the air handler 14 and flows back as a vapor through tube 54 to the inlet of the compressor 40.

In operation, as shown in FIG. 3, the compressor 40 draws the working fluid into the inlet of the compressor and raises the pressure of the working fluid causing it to become a hot vapor. The hot, vaporized working fluid is then pumped through a condensing coil 46 which removes heat given off, as the temperature drops to condensation temperature, during the liquefaction of vaporized refrigerant in the expansion coil 52. Then, more heat (specifically the latent heat of condensation) is released as the working fluid liquefies. There are air-cooled and water-cooled condensers, named for their condensing medium. The more popular, as shown in FIG. 3, is the air-cooled condenser. The condensers consist of a coiled tube(s), typically with external fins (not shown). The working fluid is forced through the condensing coil 46. In order to remove as much heat as possible, the condenser coils 46 are arranged to maximize surface area. Fans, see fan blade 36 in FIG. 2, are often used to increase air flow by forcing air over the surfaces of the condenser coil 46 and thus increase the condenser coils capability to give off heat.

After the working fluid flows through condenser coils 46, the working fluid goes through an expansion valve 48, where the working fluid experiences a pressure drop. Finally, the working fluid flows through tube 50 to the evaporator coil 52 in the air handler 14. The working fluid refrigerant draws heat through the evaporator coil 52 from the recycled air returning from the zones being cooled which causes the working fluid within the evaporator coil 52 to vaporize. The vaporized working fluid then goes through line 54 to the input of the compressor 40 to restart the cycle. The aforementioned process is engaged when cooling is desired. When heating is desired, the aforementioned process is simply reversed.

Figure 4:
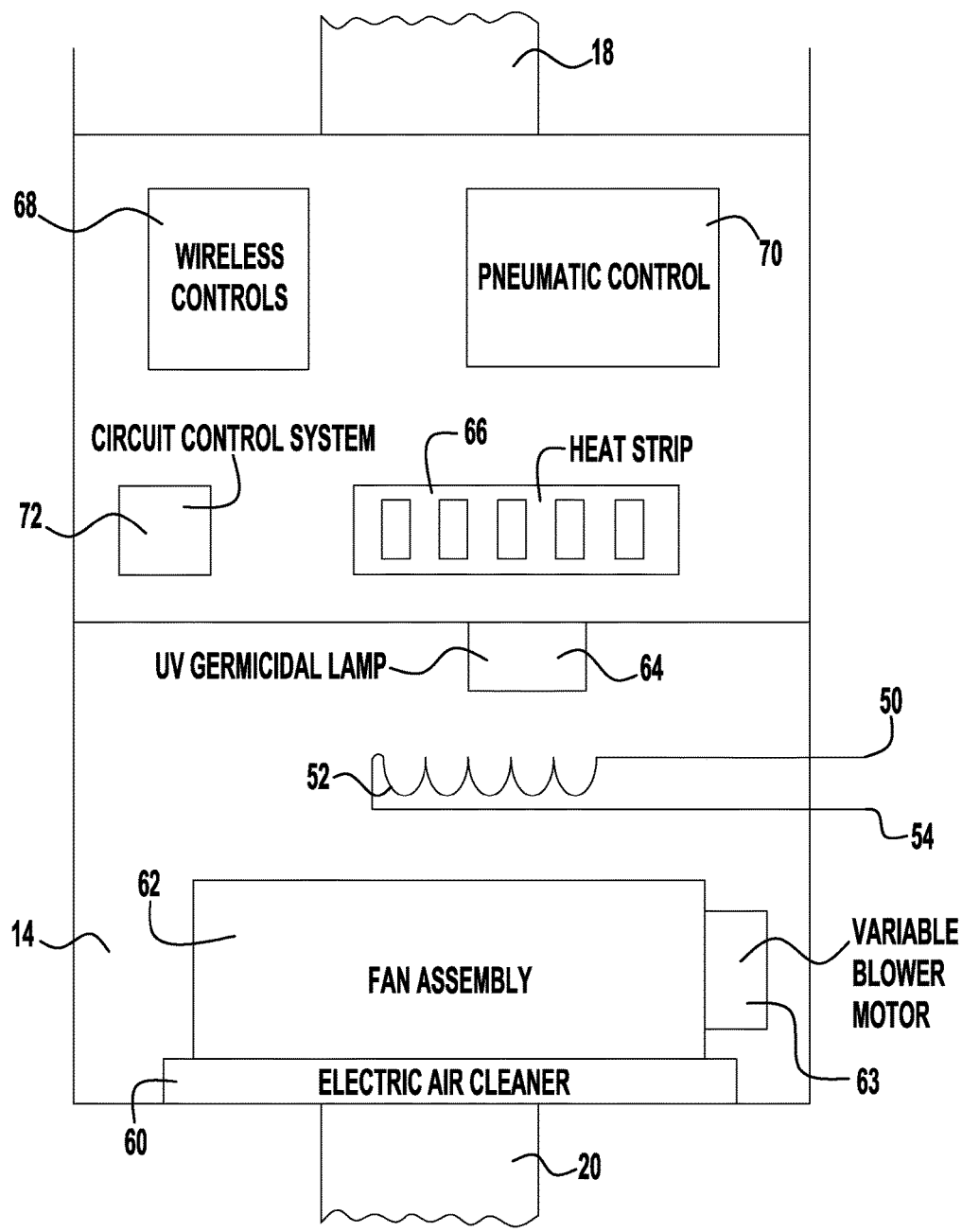
FIG. 4 is a front schematic view of the air handler and its associated components, in accordance with the present invention.

FIG. 4 illustrates the air handler 14, designed to deliver the programmed amount of airflow to each zone 16a-16d as the individual thermostats in each zone calls for it (as described later). The air handler 14 includes an electronic air cleaner 60, a high static, fan assembly 62 powered by a variable blower motor 63, a UV Germicidal Lamp 64, a supplemental heat strip 66, such as an electric heater, wireless controls 68, multiple zone, pneumatic control 70, and a circuit control system 72.

The electronic air cleaner 60 is a device which removes contaminants from the re-circulated air which enters the air handler 14 through return line 20 and is channeled through the air cleaner to purify it. The electronic air cleaner 60 provides clean, dust-free air to the building occupants. The air cleaner 60 can incorporate low-MERV rated, pleated media filters, HEPA filters, electrostatic filters or a combination of the different filtering techniques. Gas-phase and ultraviolet air treatments may be incorporated in the electronic air cleaner 60. The electronic air cleaner 60 is typically located at the bottom of the air handler 14 in order to keep all the downstream components across which the re-circulated air flows clean. Depending upon the grade of filtration required, typically filters will be arranged in two (or more) successive banks with a coarse-grade panel filter provided in front of a fine-grade bag filter, or other "final" filtration medium. The panel filter is cheaper to replace and maintain, and thus protects the more expensive bag filters.

The fan assembly 62 powered by a variable blower motor 63 blows the re-circulated air, which is called supply air after leaving the fan assembly 62, through the air handler 14, into the supply or trunk line 18 and then into supply lines 18a-18d to the various zones 16a-16d, as seen in FIG. 1. An example of a variable speed blower motor is a Carrier Bryant Variable Speed Blower Motor from Carrier Corporation. The supply air passes over the evaporating coil 52, as described in conjunction with FIG. 3, where it is cooled or heated, depending on the operation of the heat pump 12 and the temperature of the working fluid being circulated through the evaporating coil 52. The supply air, after passing across the evaporating coil 52, flows into trunk line 18 and then divides up into the supply lines 18a-18d for distribution as hot or cold air to the zones 16a-16d.

Air handler 14 generates about 2000 cubic feet per minute (cfm) of air at a static pressure of generally between 1.75 inches and 2.25 inches, and preferably about 2 inches of static pressure. Conventional HAVC systems generate 2000 cfm of air with a much lower static pressure, in the general range of 0.1 inches. The increased static pressure generated in by HVAC System 10 causes a much larger amount of air through supply lines 18a-18d, causing for a reduced amount of lines needed to be provided from the air handler to the zones. Besides the supply lines 18a-18d and the return lines 20a-2d being rather small, i.e., having a diameter of about 3 inches, and therefore less expensive than the prevalent, larger metal ductwork, the small diameter lines can also be more easily installed into the compact distance between studs. Typically the studs are 12 inches apart from each other and can accommodate four (4) 3 inch diameter lines 18a-18d therebetween.

The supply air can be disinfected by passing under the ultraviolet (UV) Germicidal lamp 64. The disinfection method uses ultraviolet light with a sufficiently short wavelength to kill microorganisms. The supply air being forced past the UV Germicidal Lamp 64 has the effect of killing potentially harmful microorganisms before the supply air is dispersed throughout the zones 16a-16d.

The electric heater 66, such as a 20 KW electric heater, is used to provide extra heat to raise the temperature of the supply air. Typically, the electric heater 66 is used when the temperature outside is very cold, such as below 32°. The supply air that the fan assembly 62 powered by a variable blower motor 63 blows can pass over the electric heater 66 to provide extra heat to the supply air before it is dispersed through the supply lines 18a-18d to the various zones 16a-16d.

The temperature in each of the various zones 16a-16d can be regulated through a thermostat (described later) 58a, 58b, 58c, 58d (58a-58d) which activates the wireless controls 68 within the air handler 14.

The air handler 14 includes a circuit control system 72 for programming the HVAC system 10. The circuit control system includes a circuit breaker to protect the HVAC system 10 from damage caused by a power overload or a short circuit. Its basic function is to detect a fault condition and, by interrupting continuity, to immediately discontinue electrical flow into the system.

Figure 5:
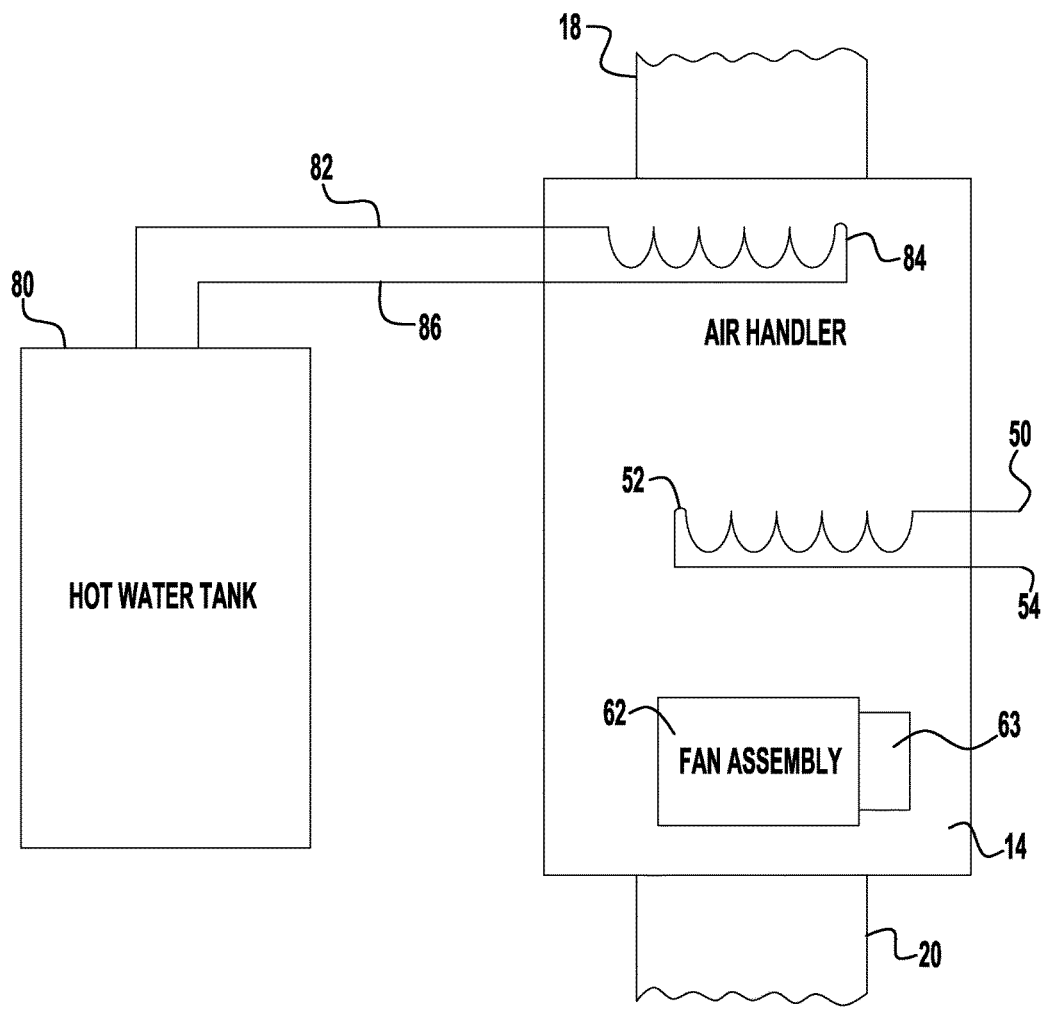
FIG. 5 is a front view of the hot water storage tank in use with the air handler, in accordance with the present invention.
Figure 7:
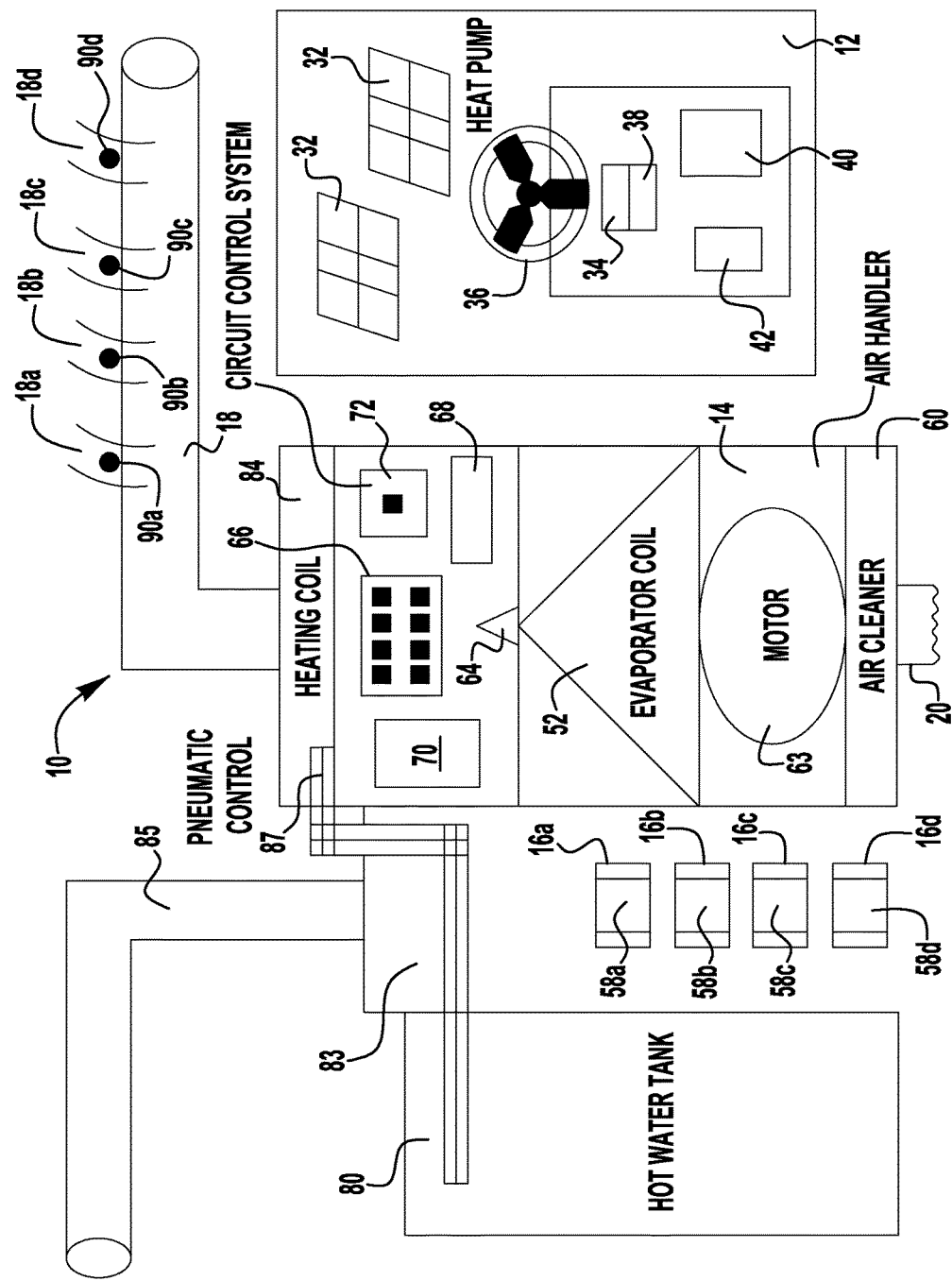
FIG. 7 is a schematic view of the overall heating, ventilation and air-conditioning (HVAC) system, in accordance with the present invention.

Referring to FIG. 5, there is illustrated an alternative embodiment in which the HVAC system 10 incorporates a supplemental hot water tank 80 that is used for heating and storing hot water for space heating. Generally, water is a convenient heat storage medium, because it has a high specific heat capacity and compared with other substances, it can store more heat per unit of weight (and volume). Water is non-toxic and low in cost. The hot water tank 80 can pump hot water with a pump (not shown) through a tube 82 to a heating coil 84, preferably located on the upper end of air handler 14 just below the supply line 18 and then back through a tube 86 to the hot water tank. As seen in FIG. 7, a direct vent boiler 83 heats water that is stored in the hot water tank 80, as well as heating water for other needs in the house or building. A PVC vent pipe 85 provides a conduit for exhaust from the direct vent boiler 83. An automatic water regulating flow valve 87 controls the amount of water that enters the heating coil 84. When in use, the supply air that the fan assembly 62 powered by a variable blower motor 63 blows over the evaporator coil 52 can also pass across the heating coil 84 to additionally heat the supply air, before it is delivered into the supply flow lines 18 to the various zones 16a-16d. Typically, the heating coil 84 receiving hot water is from the supplemental hot water tank 80 when the temperature outside is very cold, such as below 32°.

Figure 6:
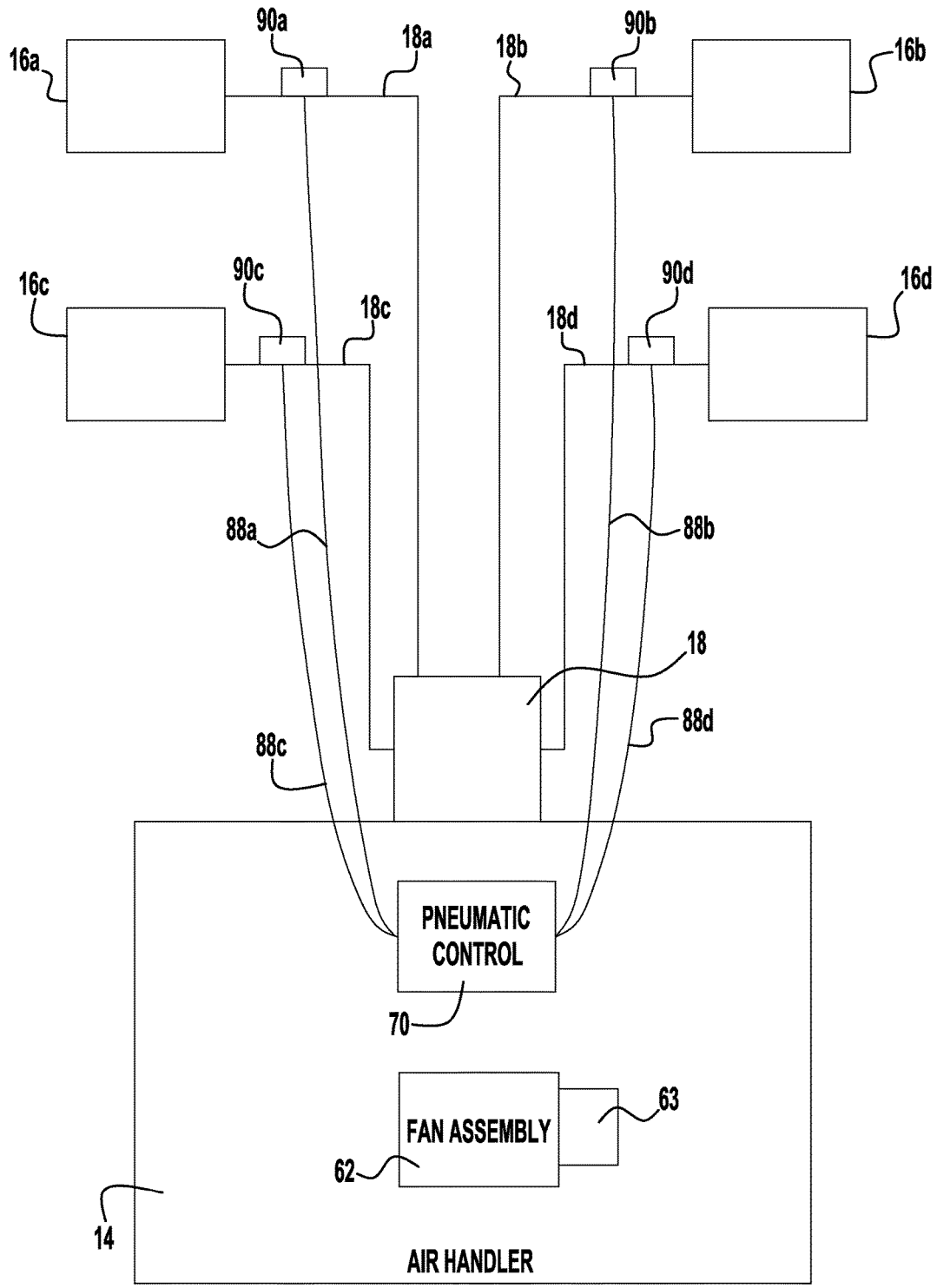
FIG. 6 is a front view of the air handler and various zones where temperature is regulated, in accordance with the present invention.

Referring to FIG. 6, multiple zone, pneumatic control 70 is connected through air lines 88a, 88b, 88c, 88d (88a-88d) to damper valves 90a, 90b, 90c, 90d (90a-90d) located in supply lines 18a-18d, respectively. The central supply line 18 is connected to a series of PVC tubing 18a-18d that disperses treated air blown through air handler 14 with high static, variable blower motor 62 to the zones 16a-16d. Further, PVC tubing 20a-20d, as shown in FIG. 1, returns re-circulated return air to the air handler 14 to be purified through the air cleaner 60 and then heated or cooled to be re-dispersed to the zones 16a-16d. The air operated, damper valves 90a-90d can be opened or closed by the pneumatic control 70 to vary the amount of supply air going into the zones 16a-16d. For example, if one zone is larger than the other zones, the damper valve in the lines to the smaller zones could be closed so that more supply air is directed into the large zone than the smaller zones. Alternatively, if the larger zone demanded supply air, the damper valves in the lines to the smaller zones could be closed so that all the supply air is sent to the larger zone. Of course there are many variations of which damper valves are opened or closed depending on the temperatures desired in each zone. The pneumatic control 70 could be integrated with the thermostats 58a-58d in each zone and the wireless control 68 so that the zones can be controlled as desired.

An advantage of an embodiment is that the flexible, plastic duct tubing forming the supply and return pipes 18a-18d, and 20a-20d as well as the trunk line 18 are flexible so that they can be easily and quickly installed. The trunk line 18 may be of any suitable dimensions and material, such as for example 8.5"×10", or about 10" in diameter and constructed of a plastic polymer. Further, it is within the terms of the embodiment that there be more than one trunk line. Supply pipes and return pipes 18a-18d and 20a-20d, respectively may be of any suitable dimensions and material, such as for example 3" in diameter and constructed of a flexible, plastic polymer. This allows four pipes to fit between two studs that are placed 12" apart from each other.

FIG. 7 is an overall illustration of the complete HVAC System 10. As discussed earlier, HVAC system 10 includes a plurality of components comprising: a. flexible, plastic duct tubing forming supply pipes 18 that connect the air handler 14 to a plurality of zones 16a-16c to deliver supply air to the zones in the house or building in response to thermostats 58a-58d located in the zones. Return pipes 20 connect the air handler 14 and the plurality of zones 16 to re-circulate return air from the zones to the air handler. The air handler 14 has a fan assembly powered by a variable blower motor 63 to blow supply air through the supply pipes 18 to the plurality of zones 16 to individually control air humidity, air purity and air temperature within the zones in the building or house. A heat pump 12 having a variable compressor 40 powered by a variable compressor motor 42 directs a working fluid to and from the air handler and a variable fan motor 34 rotates a fan blade 36 within the heat pump. A circuit control system 72 is provided for adjusting the variable compressor motor and the variable fan motor in the heat pump and the variable blower motor in the air handler in response to the capacity required by the HVAC system. A plurality of damper valves 90a-90d are located in supply lines 18a-18d, respectively.

In operation, each zone 16a-16d has a thermostat 58a-58d, respectively. Each thermostat 58a-58d is a component of the HVAC System 10, which senses the temperature in each particular zone 16a-16d so that the temperatures in each of the different zones are maintained near a predetermined setpoint. Generally, thermostats 58a-58d can be constructed in many ways and may use a variety of sensors to measure the temperature in the zone where they are located. The temperature also accounts for air humidity. The thermostats 58a-58d do this by activating the air handler 14 with wireless controls 68 and supplying conditioned air to the different zones 16a-16d. The temperature of the supplied air can be regulated by the flow of a working fluid as needed from the heat pump 12. In addition, the heat strip 66 and or the coil 84 connected to the storage tank 80 can be used to control the temperature of the supply air so as to maintain the desired temperature in the different zones. In addition, the air operated, damper valves 90a-90d can be controlled by the pneumatic control 70 to vary the amount of supply air going into each zone 16a-16d.

An improvement in the HVAC system 10 is due to the use of the variable motors including the variable compressor motor 42 and the variable fan motor 34 in the heat pump 12 and the variable blower motor 63 in the air handler. In general terms, the method of operating the VVAC System 10 includes: a. delivering supply air to a plurality of zones in the house or building from an air handler through flexible, plastic duct tubing; b. re-circulating return air from the zones to the air handler through flexible, plastic duct tubing; c. blowing supply air with a fan assembly powered by a variable blower motor disposed within the air handler to the plurality of zones; d. directing a working fluid from a heat pump having a variable compressor powered by a variable compressor motor to and from the air handler; e. rotating a fan blade within the heat pump with a variable fan; and f. adjusting the variable compressor motor and the variable fan motor in the heat pump and the variable blower motor in the air handler in response to the capacity required by the HVAC system.

During the operation of HVAC system 10, it sometimes happens that less than the full capacity of the system is required, such as when only one zone is calling for about 30% of the capacity of the heat pump 12 and the air handler 14. In typical HVAC systems, both the heat pump and the air handler would be operated at full capacity even though only 30% of the capacity is required. With the present embodiment, the circuit control system 72 for programming the HVAC system 10 can adjust the variable compressor motor 42 and the variable fan motor 34 in the heat pump 12 and the variable blower motor 63 in the air handler so that the system is operating at 30% of its capacity. In the case where one zone requires 30% of its capacity and another zone requires 20% of its capacity, the circuit control system 72 for programming the HVAC system 10 can adjust the variable compressor motor 42 and the variable fan motor 34 in the heat pump 12 and the variable blower motor 63 in the air handler so that the system is operating at 50% of its capacity. In addition, any one or combination of the variable compressor motor 42 and the variable fan motor 34 in the heat pump 12 and the variable blower motor 63 can be adjusted by the circuit control system 72.

It is within the terms of the embodiment that a user manually controls the temperature, humidity, and any other climate settings. Alternatively, the system 10 may be controlled automatically, regulating itself to a preset temperature and humidity in each zone.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. An HVAC system for a house or building, said HVAC system comprising:
    a plurality of zones comprised within the house or building that require cooling;
    supply pipes that fluidly connect an air handler to the plurality of zones to deliver air from the air handler to the plurality of zones;
    return pipes that fluidly connect the air handler to the plurality of zones to return air from the plurality of zones to the air handler;
    wherein the supply pipes and the return pipes are plastic and flexible;
    the air handler comprising a fan assembly and a variable blower motor, wherein the fan assembly is powered by the variable blower motor to blow the air through the supply pipes to the plurality of zones to individually control air humidity, air purity and air temperature within the plurality of zones in the house or building;
    a heat pump having a variable compressor powered by a variable compressor motor to direct a working fluid to and from the air handler;
    a plurality of solar panels to power a variable fan motor, the variable blower motor and the variable compressor motor;
    the heat pump further comprising a fan blade, an alternator and the variable fan motor within the heat pump;
    the variable fan motor comprising a shaft that rotates the fan blade and the alternator when the variable fan motor is powered, and when the variable fan motor is not powered a wind energy forces rotation of the fan blade thereby rotating the shaft and the alternator, thereby generating an electrical energy by the rotation of the alternator and sending the electrical energy to a power grid; and
    a circuit control system configured to adjust the variable compressor motor, the variable fan motor and the blower motor.

2. The HVAC system of claim 1 further including separate controls in each zone communicating with a wireless control within the air handler to send a programmed amount of air to each zone as determined by the controls in each zone.

3. The HVAC system of claim 1 wherein the working fluid directed by the heat pump to the air handler is selected from the group comprising a refrigerant and a coolant.

4. The HVAC system of claim 3 wherein the heat pump further comprises:
    the variable compressor connected to two lines between the heat pump and the air handler.

5. The HVAC system of claim 1, wherein the air handler includes:
    an electronic air cleaner which removes contaminants from the air which enters the air handler;
    a germicidal ultraviolet lamp which kills microorganisms before the air is dispersed throughout the plurality of zones; and
    a multiple zone pneumatic control which operates a plurality of damper valves, each of the valves is located within a respective supply pipe of the plurality of pipes to vary the amount of air going into each zone.

6. The HVAC system of claim 5 further including an electric heater disposed within the air handler to provide extra heat to raise the temperature of the air before the air is dispersed through the supply pipes to the various zones.

7. The HVAC system of claim 5 further including a supplemental hot water storage tank for distributing hot water to a coil disposed within the air handler to provide heat to raise the temperature of the air before it is dispersed through the supply pipes to the various zones.

* * * * *